Dec. 23, 1958
R. N. WINFREE
2,865,594
MANUAL AND AUTOMATIC VALVES
Original Filed May 31, 1950
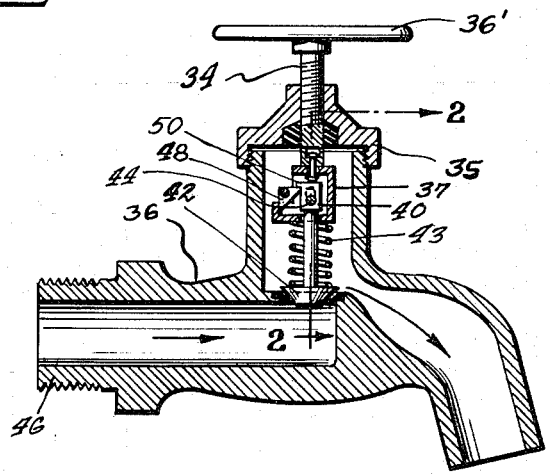
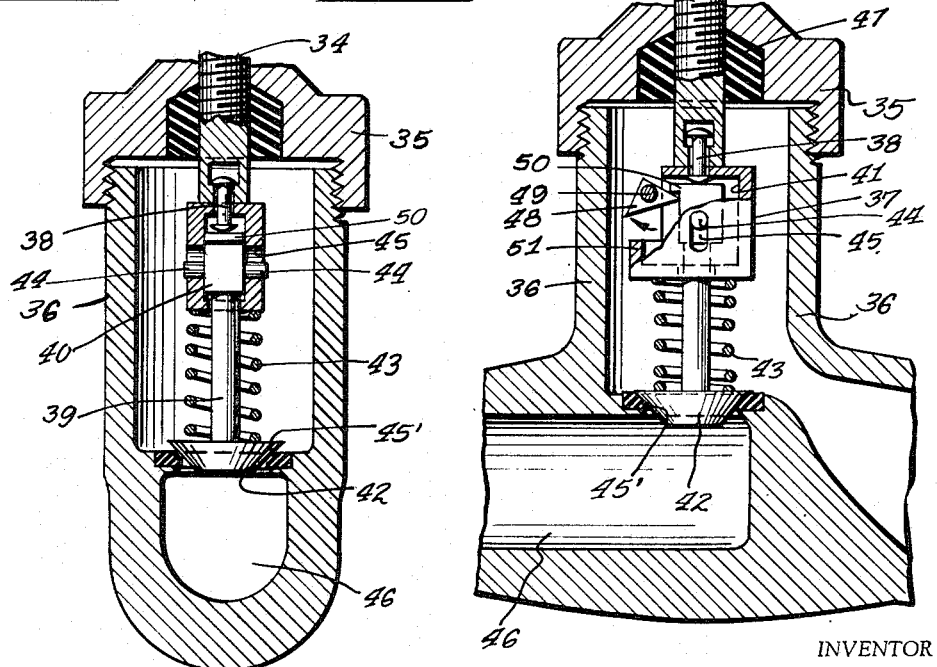
INVENTOR
*Robert N. Winfree*
BY *Young, Emery & Thompson*
ATTORNEYS United States Patent Office 2,865,594
Patented Dec. 23, 1958

2,865,594
MANUAL AND AUTOMATIC VALVES

Robert N. Winfree, Lynchburg, Va., assignor to Kel-Win Manufacturing Company, Inc.

Application July 1, 1953, Serial No. 365,487, now Patent No. 2,745,627, dated May 15, 1956, which is a division of application Serial No. 165,284, May 31, 1950, now Patent No. 2,658,716, dated November 10, 1953. Divided and this application March 6, 1956, Serial No. 569,707

2 Claims. (Cl. 251—75)

This invention relates to a valve of the type which is applicable for all water and other distribution systems both large and small. This application is a division of application Serial No. 365,487, filed July 1, 1953, now Patent No. 2,745,627 granted May 15, 1956, which was a division of Serial No. 165,284, filed May 31, 1950, now Patent No. 2,658,716 granted Nov. 10, 1953.

It is an object of this invention to provide a valve with means to cause automatic and quick closing of the valve at a point just before the final seating of the valve spindle or disk on the seat.

A further object of the invention is to provide a valve with mechanism to prevent dripping of the valve due to slow closing or closing with too light a force for complete closure.

Another object of the invention resides in the provision of a mechanism which will positively open and close the valve with the final last degree of closure taking place automatically as a quick final closure with manual effort.

A still further object of the invention resides in the provision of a valve mechanism which will prevent wear on the washer on the valve seat in that the washer is prevented from rotating so that the life of the washer is greatly prolonged, and also lack of wear will prevent loss of water due to a dripping valve or faucet when in the closed position.

Another object of the invention resides in the provision of a valve having positive means to open the valve with manual closing of the valve, but, however, final positive closing of the valve to prevent water from dripping from the valve is accomplished by spring force.

Further objects of the invention will be apparent from the following description when considered in connection with the accompanying drawings in which:

Fig. 1 is a longitudinal sectional view of the valve,

Fig. 2 is a sectional view taken on line 2—2 of Fig. 1, and

Fig. 3 is a longitudinal sectional view of the valve of Fig. 1 with the parts in another position and on a larger scale.

The valve according to Figs. 1 to 3 includes a valve spindle 34 which is threaded in a cap member 35 which latter is threaded on a valve casing 36. A valve handle 36' on the spindle 34 actuates an intermediate member 37 secured to the spindle by a swivel pin 38. This pin 38 is secured with play in the end of the spindle as shown in Fig. 2. A valve plunger 39 is suspended from the intermediate member 37 by means of an enlarged portion 40 and at the upper end it is slidable in an opening 41 in the intermediate member 37. A valve closure 42 is provided at the lower end of the plunger 39 and a compression spring 43 bears at one end on the closure 42 with the other end against the member 37. As shown in Figs. 2 and 3, the portion 40 is provided with a pin 44 which cooperates with a pair of elongated slots 45 in the member 37.

The valve closure 42 cooperates with a washer 45' mounted in the inlet end 46 of the spigot casing 36. A washer or packing member 47 is provided at the upper end of the casing 36 to seal the spindle 34 against water leakage.

A sear member 48, which is substantially triangularly shaped, is pivotally mounted on a pin 49 which is secured in the casing 36. This trigger or sear 48 cooperates with a projection 50 on the portion 40, Fig. 3, as well as with a cup-shaped retaining member or edge 51, and in the position of Fig. 1 the sear 48 holds the valve in open position by cooperation with the projection 50 and the edge 51.

As shown in Fig. 1, the valve is open and in Fig. 3 the valve is closed. As to the operation of the valve of Figs. 1 to 3, to open the valve, the spindle 34 moves upwardly by rotation of the handle 36', Fig. 1, to engage the pin 38 by taking up the slack so that finally the member 37 is raised together with the plunger 39 against the force of the spring 43. At the same time the sear member 48 will rotate counterclockwise by gravity or by a spring (not shown) until the parts are in the position as shown in Fig. 1 in which the lower edge of the sear 48 is held by the edge 51, Fig. 1, of the member 37. If now the valve is to be closed, the parts will move down until the valve closure 42 is almost on or in contact with the washer 45 at which moment as the intermediae member 37 is lowered by the handle 36' the sear 48 will be released from the edge 51, Fig. 3, so that the spring 43 will automatically close the valve closure 42 and prevent any dripping of the spigot even though the handle 36' is not quite turned manually to the closed position.

If necessary the casing 36 may be provided with means to guide the valve plunger 39 so that it will not move out of lateral alignment with the washer 45'.

From the described and illustrated valve spigot, it will be apparent that the structure is such that the final closing of the valve is accomplished automatically and not by any manual control. It so often happens that valves are not tightly closed which will result in a water drip which is, of course, to be avoided due to waste of water. If on the other hand the valve is closed very tight by manual effort, the washer will soon wear out or be actually torn, which will cause a drip with resultant loss of water. Thus with the structure of the present invention the valve is closed manually to just where it will drip and thereafter automatically the valve is tightly closed. The valve of this invention will thus save on water consumption, and also on washer replacement since there is practically no wear on the washer.

I claim as my invention:

1. A valve for fluid systems comprising a casing, an inlet and an outlet in the casing, a valve seat in the casing, a valve stem having a closure on one end and a projection on the other end, said valve stem being mounted in the casing, a spindle with a handle at one end for operating the valve and provided on the outside of the casing, an intermediate member in the casing and connected to the projection and to the other end of the spindle with lost motion connections at the spindle connection and at the projection connection, a spring mounted between the closure and the intermediate member, and a trigger element pivotally mounted in the casing and projecting into the intermediate member to cooperate and contact the projection on the valve stem when the valve is in the open position and when the handle is turned to close the closure onto its seat, the trigger element is restrained by the intermediate member against pivotal movement until just before closing when the trigger element is released for rotation to permit the spring to automatically cause seating of the closure on the seat due to spring action and lost motion between the valve stem and the intermediate member.

2. A valve according to claim 1, in which the intermediate member is provided with a retaining member against which the trigger element abuts in the open position of the valve to restrain the trigger against pivotal movement.

References Cited in the file of this patent

UNITED STATES PATENTS

| | | |
|---|---|---|
| 2,030,143 | Knusli | Aug. 1, 1934 |
| 2,310,745 | Parks | Feb. 9, 1943 |

FOREIGN PATENTS

| | | |
|---|---|---|
| 43,668 | Germany | July 2, 1888 |